United States Patent
Cripe

(10) Patent No.: US 7,320,255 B2
(45) Date of Patent: Jan. 22, 2008

(54) TORQUE SENSOR MAGNETOMETER

(75) Inventor: David W. Cripe, Chatham, IL (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 118 days.

(21) Appl. No.: 11/352,712

(22) Filed: Feb. 13, 2006

(65) Prior Publication Data

US 2007/0034004 A1    Feb. 15, 2007

Related U.S. Application Data

(60) Provisional application No. 60/707,635, filed on Aug. 12, 2005.

(51) Int. Cl.
*G01L 3/02*    (2006.01)

(52) U.S. Cl. .......................... 73/862.331; 73/862.332; 73/862.333; 73/862.334; 73/862.335; 73/862.336

(58) Field of Classification Search ............................... 73/862.331–862.336
See application file for complete search history.

(56) References Cited

U.S. PATENT DOCUMENTS

| | | | |
|---|---|---|---|
| 4,989,460 A * | 2/1991 | Mizuno et al. | ........ 73/862.335 |
| 5,351,555 A | 10/1994 | Garshelis | |
| 5,696,575 A | 12/1997 | Kohnen et al. | |
| 5,889,215 A | 3/1999 | Kilmartin et al. | |
| 5,939,881 A | 8/1999 | Slater et al. | |
| 6,145,387 A | 11/2000 | Garshelis | |
| 6,222,363 B1 | 4/2001 | Cripe | |
| 6,298,467 B1 | 10/2001 | Chuang et al. | |
| 6,300,855 B1 | 10/2001 | Clark et al. | |
| 6,346,812 B1 | 2/2002 | May et al. | |
| 6,516,508 B1 | 2/2003 | Gandarillas | |
| 6,553,847 B2 | 4/2003 | Garshelis | |
| 6,698,299 B2 | 3/2004 | Cripe | |
| 6,823,746 B2 * | 11/2004 | Viola et al. | ............ 73/862.335 |
| 2002/0162403 A1 | 11/2002 | Cripe | |
| 2004/0007083 A1 * | 1/2004 | Viola et al. | ............ 73/862.335 |
| 2007/0034021 A1 * | 2/2007 | Cripe | .................... 73/862.331 |
| 2007/0038401 A1 * | 2/2007 | Cripe | ........................ 702/104 |
| 2007/0062312 A1 * | 3/2007 | Cripe | .................... 73/862.333 |
| 2007/0069723 A1 * | 3/2007 | Cripe | ........................ 324/253 |

* cited by examiner

*Primary Examiner*—Edward Lefkowitz
*Assistant Examiner*—Freddie Kirkland, III

(57) ABSTRACT

The magnetometer assembly according to this invention includes a first coil assembly and a second coil assembly for detecting separate magnetic fields along an axial portion of a torque transducer. The first and second coil assemblies are driven by independently adjustable circuits. Each of the circuits are independently adjustable to adjust the gain that is distributed to each of the first and second coils. This provides for an adjustment and precise alignment of a magnetic field generated by the first coil and the second coil assembly such that external magnetic fields can be cancelled providing increased accuracy and reduced hysteresis effects.

16 Claims, 2 Drawing Sheets

TORQUE SENSOR MAGNETOMETER

CROSS REFERENCE TO RELATED APPLICATION

This application claims priority to U.S. Provisional application No. 60/707,635 filed on Aug. 12, 2005.

BACKGROUND OF THE INVENTION

This invention generally relates to a magnetometer for a torque sensor. More particularly, this invention relates to a magnetometer including several coils disposed relative to each for measuring torque related divergent magnetic fields.

A non-contact, magnetoelastic type torque sensor typically includes a torque transducer element that responds to the application of torque by generating a magnetic field. Such generated or changed magnetic fields are detected by a magnetometer. The torque transducer element typically includes a magnetoelastic material that responds to the application of torque by generating a corresponding magnetic field. The application of torque to the magnetoelastic material creates shear stresses within the magnetized regions causing the direction of the magnet field generated by the torque transducer element to shift from a substantially circumferential direction to a helical direction. The helical shifting of the magnetic field is detected as an axial component of the magnetic field. The axial component of the magnetic field is proportional to the applied torque and provides an accurate and reliable indication of torque applied to a torque element.

Sensing of the magnetic field and specifically the axial components of the distortions in the magnetic field caused by torque is accomplished through the use of magnetic field sensors. A commonly used type of magnetic field sensors is a flux gate sensor, which is fabricated as a coil of fine wire surrounding a core of magnetically saturatable material, and is supplied with an alternating current. The alternating current provides for the periodic magnetic saturation of the magnetic elements. The magnetic field produced by the torque transducer shaft is superimposed on the periodic magnetic field generated by the coils. Superimposing the magnetic field produced by the torque transducer shaft creates an asymmetry in the magnetic saturation of the coils. Changes in the inductance of the coils due to magnetic saturation results in a voltage that is induced to the coils. It is this voltage that is measured to determine the amplitude and direction of torque applied to the torque transducer element.

A known prior art magnetic field sensor includes a bobbin having upper and lower axial sections separated by a central flange. The upper and lower coils are isolated from each other and are induced with an alternating current to produce a magnetic field. Magnetically saturatable strips are disposed between the coil and the torque transducer element. These magnetic strips are magnetically saturated by the alternating current that is produced within the coils. The magnetic strips are disposing parallel to the shaft and the axis of rotation. The magnetic strips are fabricated from a material that possesses a very abrupt magnetic saturation characteristic, meaning that the magnetic strips are saturatable through a small change in applied magnetic field and in the absence of the magnetic field quickly demagnetize.

Disadvantageously, manufacturing tolerances of each of the flux gates and magnetic asymmetries of the torque transducer and magnetoelastic materials can result in an incomplete cancellation of the external magnetic fields such as the earth's field effects.

Accordingly, it is desirable to design and develop a device and method for independently adjusting the sensitivities of each flux gate sections to permit precise cancellation of the effects of external magnetic fields.

SUMMARY OF THE INVENTION

An example magnetometer according to this invention includes a first coil assembly and a second coil assembly disposed about a common axis and spaced an axial distance from the first coil. The first coil and the second coil are driven by a magnetometer circuit that includes a first circuit for driving the first coil and a second independent circuit for independently driving the second coil.

The first coil assembly includes an inner coil and an outer coil and a first plurality of magnetically saturatable elements disposed therebetween. The second coil assembly includes a second inner coil and a second outer coil and a second plurality of magnetically saturatable elements disposed therebetween.

The first circuit and the second circuit are driven independently of each other and also include an independently adjustable gain. The gain of the first circuit and the second circuit may be adjusted independently of each other so that the transducer is given the ability to reject the effects of common mode signals or external magnetic fields such as those generated by the earth's magnetic field. The particular phasing of the first and second circuits generates drive signals to their respective first coil and second coils that are separated by 90°. This separation causes a ripple current at each of the first coils and the second coils that are out of phase with each other. This out of phase ripple current attenuates the ripple that is present at the circuit power supply.

Accordingly, the magnetometer of this invention provides dual identical circuits that drive different fluxgates about a torque transducer that are independently adjustable to accommodate differences caused by manufacturing tolerances or other external and internal inconsistencies to provide for the effective cancellation of the effects generated by external magnetic fields.

These and other features of the present invention can be best understood from the following specification and drawings, the following of which is a brief description.

DETAILED DESCRIPTION OF THE PREFERRED EMBODIMENT

Figure 1:
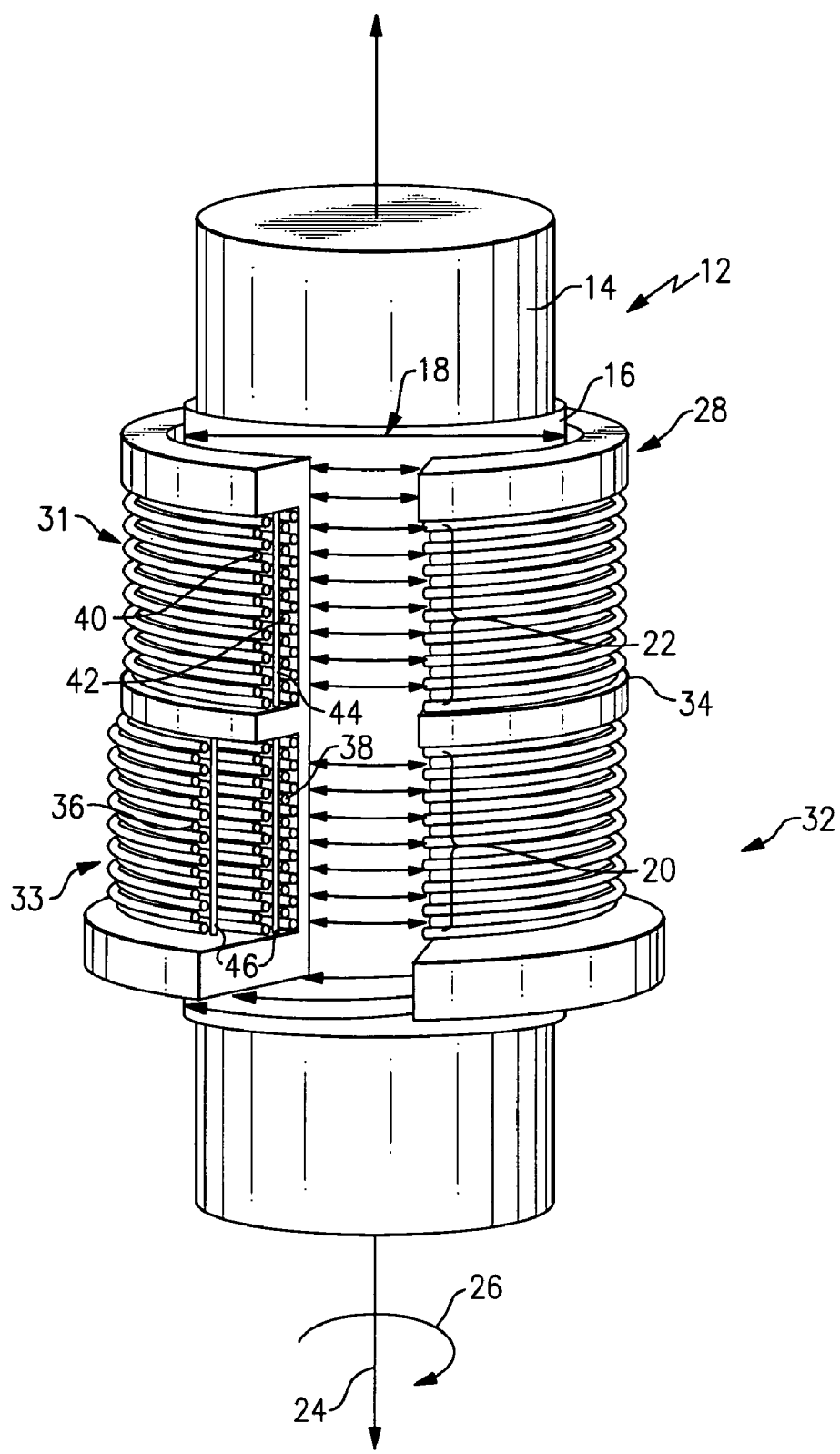
FIG. 1 is a schematic illustration of a coil assembly according to this invention.
Figure 2:
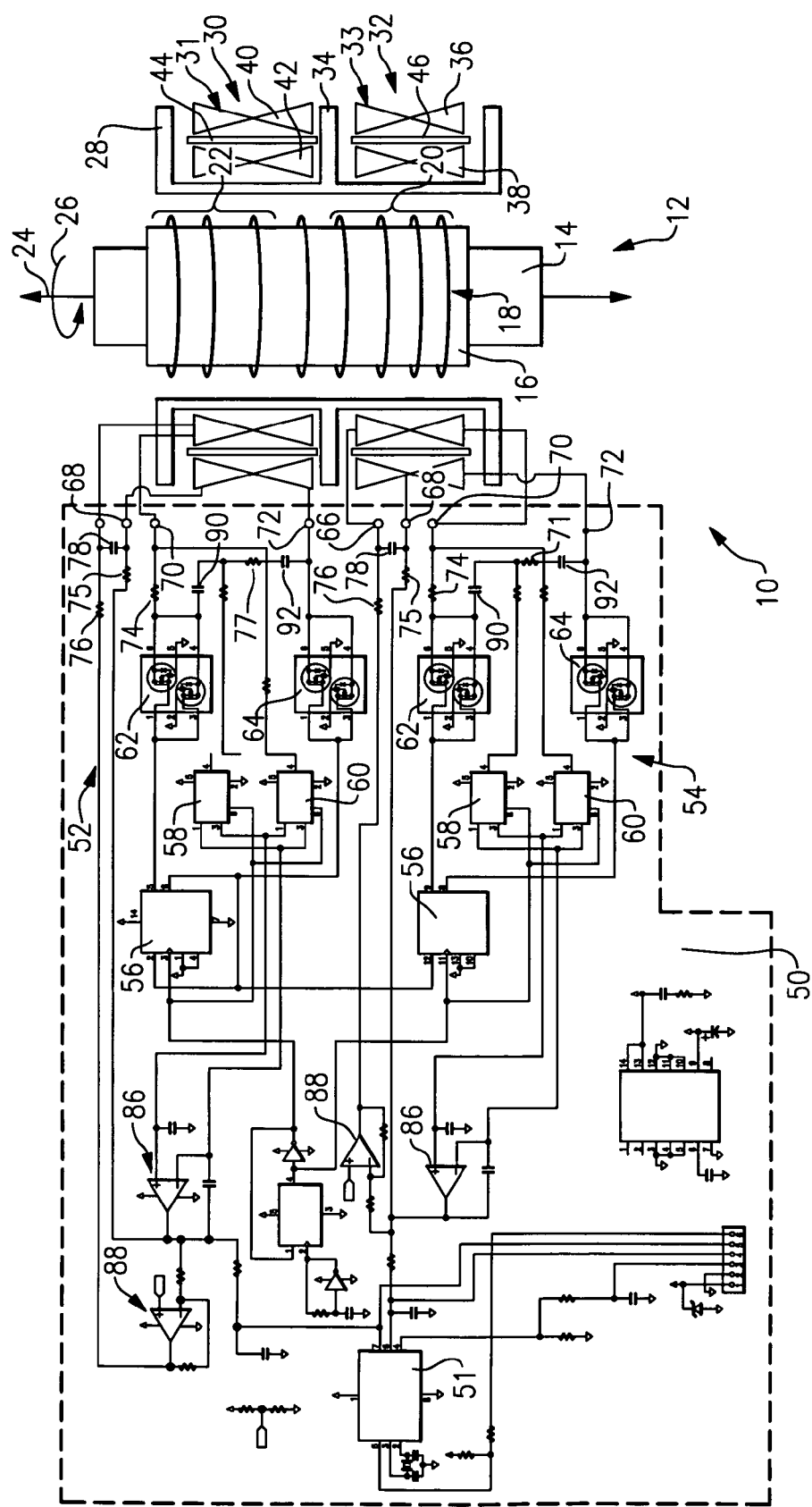
FIG. 2 is a schematic representation of a magnetometer circuit according to this invention.

Referring to FIGS. 1 and 2, a torque sensor assembly 10 according to this invention includes a torque transducer 12 comprised of a shaft 14 disposed about an axis 24. Affixed to the shaft 14 is a ring 16 of magnetoelastic material. The magnetoelastic material generates a magnetic field 18 in response to the application of a torque 26. As appreciated, although a torque transducer is illustrated other force sensors using magnetoelastic material to generate magnetic fields responsive to the application of torque would also benefit from the disclosures of this invention.

Disposed concentrically about the torque transducer 12 is a bobbin 28. The bobbin 28 includes an upper region 30 and a lower region 32. The upper region 30 and the lower region 32 are separated and spaced apart axially by a middle flange member 34. Each of the first region 30 and the second region 32 includes a coil assembly. The upper region 30 includes a first coil assembly 31 that comprises a first outer coil 40 that is disposed about a first inner coil 42.

Disposed between the first outer coil 40 and the first inner coil 42 is a plurality of magnetically saturatable elements 44. The magnetically saturatable elements 44 comprise a plurality of thin axially orientated strips of magnetically saturated material such as wire that are equal angularly distributed about the circumference of the first inner coil 42. The first inner coil 42 and the first outer coil 40 include an equal number of windings that are comprised of a common grade or size of wire. The first inner coil 42 is wound in a first direction such that it generates a magnetic field having a first orientation. The first outer coil 40 includes an equal number of windings and is wound in a direction opposite that of the direction of the first inner coil 42 such that it generates a magnetic field that is equal and opposite to the magnetic field generated by the first inner coil assembly 42.

A second coil assembly 33 includes a second inner coil 38 and a second outer coil 36 disposed and spaced apart an axial distance from the first inner and outer coils 40, 42. The second inner and outer coil assemblies 38, 36 are also of substantially equal and opposite configurations to generate magnetic fields that are opposed yet equal. The second inner and outer coils 36, 38 include a second plurality of equal angularly magnetically saturated elements 46. As appreciated, this configuration provides for identical first and second coil assemblies to detect changes or magnetic fields generated in a first portion 20 and a second portion 22 of the torque transducer 12.

The first inner and outer coils 40, 42 and the second inner and outer coils 36, 28 generate outputs that are differentially summed to subtract the common mode effects caused by exposure to the earth's magnetic field. It is desirable for the magnetic fields generated by the magnetically saturatable elements and the outputs generated by the first and second coil assemblies 31, 33 to be equal and opposite such that they cancel out external magnetic fields such as those produced by the earth's magnetic field effects.

However, manufacturing tolerances and other inconsistencies can cause undesirable asymmetric magnetic saturations which can errantly be determined and read as application of torque to the torque transducer 12. It is therefore desirable to include a system or a means of independently adjusting the first coil assembly 31 and the second coil assembly 33 to account for relative inconsistencies such that each axial region 30, 32 of the torque transducer 12 are applied equally such that opposing magnetic fields cancel out any external magnetic fields in the absence of the application of torque.

Referring to FIG. 2, the first and second coil assemblies 31, 33 are driven by a magnetometer circuit 50. The magnetometer circuit 50 includes a first circuit 52 and a second circuit 54 that are independent of each other. The first circuit 52 is attached to drive and receive signals from the first coil assembly 31 and the second circuit 54 is attached to communicate and drive the second coil assembly 33.

The first circuit 52 includes a Schmidt trigger RC clock oscillator 51 that provides a time-based reference for both the first and second circuits 50, 52. The frequency from the clock oscillator 51 is divided by a d-flip-flop 56 to provide a pair of complementary square wave outputs at half the reference clock frequency. This frequency from the d-flip-flop 56 is fed to input flip-flops 58 and 60. These divide the single frequency an additional time to yield quadrature outputs from the two respective flip-flops 58, 60. The complementary square wave output is then used to drive MOSFETS 62 and 64. These provide low impedance complementary voltage square waves with which to drive the first coil assembly 30.

Terminals 66, 68, 70, 72 correspond to the start of the windings for the first coil assembly 31. Resistors 74 and 77 are placed in series with the terminals 70 and 72 to provide for monitoring of the current flow through the plurality of magnetically saturatable members 44. A large value capacitor 78 connects the opposite terminals 66 and 68 of the outer and inner coils 40, 42 to provide a low impedance path for alternating current flow of the excitation voltage.

The polarity of the inner coil 40 and the outer coil 42 is such that the magnetic field resulting from the alternating current excitation is concentrated into the plurality of magnetically saturatable members 44. This results in a periodic magnetic saturation at positive and negative current feeds. The saturation of the magnetically saturatable members 44 results in a change in the inductance that affects the impedance. The saturation of the magnetically saturatable members 44 further results in a distortion of voltage present at the common node of the inductor and the sense resistor 74.

Magnetic fields present at the magnetically saturatable members 44 are superimposed on the alternating magnetic field generated by the coil assembly 31. This creates an asymmetry in the duration and saturation of the saturatable members 44 between the positive and negative half cycles of the citation waveform. While the normal waveform at the resistor 74 will be completely comprised solely of odd order harmonics of the excitation waveform, asymmetric saturation due to the non-zero magnetic field will result in the presence of an even order harmonics. These even order harmonics are detected through the use of a switching demodulator and operated at a frequency double that of the excitation frequency. The output of the demodulator will contain a DC term proportional to the even order harmonic content of the sample resistor voltage. This is then integrated in an op-amp 86 and this output buffered through a second op amp 88 through a desired gain.

The two op-amps 86, 88 possess complimentary outputs centered around 2.5 volts. These outputs connect through current limiting resistors 75 and 76 to the terminals 66, 68 opposite the driving signals. The current through the resistors 75, 76 and through their respective windings serves to create a steady state magnetic field that exactly opposes the infinite field that results in the flux imbalance in the fluxgate conductor. The voltage present at the op-amp output 86 being proportional to the current necessary to balance the infinite magnetic field is therefore also proportional to the torque applied to the transducer 12. The even order components resulting from the saturation imbalance are a small fraction of the sample signal that is comprised primarily of odd order harmonic components.

Accordingly, this provides an input current through the op-amp 88 of a large amplitude and odd order harmonic. In this invention, the circuit is provided and comprised of capacitors 90 and 92 along with the resistor 77 which in conjunction with the circuit comprised of resistor 74, the inductance of the fluxgate winding and the series resistance of the fluxgate coil form a bridge circuit where the fluxgate sample voltage waveform is largely duplicated at the common node of capacitor 90 and resistor 77. Because these components are linear, odd order components of the drive wave form and if the values of capacitor 90 and resistor 77 are properly selected can be made to largely resemble that of the fluxgate voltage. By employing a differential integrator circuit, the effects of the odd order components present at the fluxgate are largely eliminated.

The second circuit 54 is a duplicate of the first circuit 52 so that the ability is provided to measure the magnetic field and torque on the second half of the torque transducer 12. The gain of the two circuits 52, 54 may be adjusted independently so that the transducer is given the ability to reject the effect of common mode signals such those generated and created by the earth's magnetic field.

Accordingly, the configuration and application of a first circuit and a second circuit according to this invention provides for the adjustment of gain along different portions of a torque transducer such that the effects of external magnetic fields can be eliminated. Further, the adjustment of independent circuits along the torque transducer provides for the accommodation of inconsistent manufacturing assembly of magnetometer components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A magnetometer assembly comprising:
    a first magnetometer coil assembly including a first inner coil and a first outer coil both disposed about a common axis;
    a second magnetometer coil assembly including a second inner coil and a second outer coil disposed about the common axis and spaced an axial distance apart from the first magnetometer coil assembly; and
    a magnetometer circuit including a first circuit driving the first inner coil and the first outer coil and a second circuit driving the second inner coil and the second outer coil, wherein said first circuit drives said first magnetometer coil assembly independent of the second circuit that drives the second magnetometer coil assembly.

2. The assembly as recited in claim 1, wherein the first magnetometer coil assembly includes the first outer coil disposed concentrically about the first inner coil and a first plurality of magnetically saturatable elements disposed parallel to the common axis between the first inner coil and the first outer coil, and the second magnetometer coil assembly includes the second outer coil disposed concentrically about the second inner coil and a second plurality of magnetically saturatable elements disposed parallel to the common axis between the second inner coil and the second outer coil.

3. The assembly as recited in claim 2, wherein the first inner coil and the second inner coil generate a magnetic field disposed in a first direction and the first outer coil and the second outer coil generate a magnetic field disposed in a second direction opposite to the first direction.

4. The assembly as recited in claim 2, including a bobbin onto which the first inner coil, the first outer coil, the second inner coil and the second outer coil are wound, wherein the bobbin includes a distinct axial subdivision separating the first inner and outer coils from the second inner and outer coils.

5. The assembly as recited in claim 2, wherein the first and second pluralities of magnetically saturatable elements comprise a wire having a length much greater than a cross-sectional area.

6. The assembly as recited in claim 2, wherein the first and second inner coils and the first and second outer coils coaxially encircle a magnetic region of a magnetoelastic device.

7. The assembly as recited in claim 1, wherein each of the first and second circuits include an independently adjustable gain.

8. The assembly as recited in claim 7, wherein a gain of the first circuit is adjustable independent of a gain of the second circuit for accounting for common-mode signals.

9. A torque sensor assembly comprising:
    a force-bearing element including a magnetoelastic material disposed about a common axis;
    a coil assembly including a first inner coil and a second inner coil disposed about the common axis and separated axially, a first outer coil disposed concentrically about the first inner coil and a second outer coil disposed concentrically about the second inner coil, a first plurality of magnetically saturatable elements disposed parallel to the common axis between the first inner coil and the first outer coil, a second plurality of magnetically saturatable elements disposed parallel to the common axis between the second inner coil and the second outer coil; and
    a magnetometer circuit including a first circuit driving the first inner and outer coil, and a second circuit driving the second inner and outer coils, wherein the first circuit drives the first inner and outer coils independent of the second circuit that drives the second inner and outer coils.

10. The assembly as recited in claim 9, wherein the first circuit excites the first inner and outer coils generating a first magnetic field to magnetically saturate the first plurality of magnetically saturatable elements and the second circuit excites the second inner and outer coils generating a second magnetic field to magnetically saturate the second plurality of magnetically saturatable elements.

11. The assembly as recited in claim 10, wherein the first inner coil generates a magnetic field substantially equal and opposite to a magnetic field generated by the first outer coil, and the second inner coil generates a magnetic field equal and opposite to a magnetic field generated by the second outer coil.

12. The assembly as recited in claim 11, wherein each of the first circuit and the second circuits include an independently adjustable gain to compensate for interference caused by external magnetic fields.

13. The assembly as recited in claim 12, wherein the first circuit and the second circuit are driven in quadrature.

14. A method of sensing torque with a torque sensor comprising the steps of:
    a) generating a first magnetic field with a magnetoelastic material responsive to an application of force;
    b) applying a first alternating current with a first circuit to a first coil assembly disposed concentrically about the magnetoelastic material to magnetically saturate a first plurality of magnetically saturatable elements;
    c) applying a second alternating current with a second circuit independent of the first circuit to a second coil assembly disposed concentrically about the magnetoelastic material and spaced axial apart from the first coil assembly to magnetically saturate a second plurality of magnetically saturatable elements;

d) detecting a distortion of the generated magnetic field within the first coil assembly with the first circuit indicative of a magnitude and direction of the applied force; and e) detecting a distortion of the generated magnetic field within the second coil assembly with the second circuit that is independent from the first circuit indicative of a magnitude and direction of the applied force.

15. The method as recited in claim 14, including the step of detecting a voltage at an inner node electrically coupled to the first and second inner coils and at an outer node electrically coupled at the first and second outer coils, and determining a magnitude and direction based on the detected voltage.

16. The method as recited in claim 15, including the step of feeding a signal indicative of the amplitude and direction of a waveform detected at each of the inner and outer nodes back to the first and second outer coil windings to create a magnetic field with the first and second outer coils opposing the first magnetic field generated by the magnetoelastic material.

* * * * *